(12) United States Patent
Jeacocke et al.

(10) Patent No.: US 11,526,321 B2
(45) Date of Patent: *Dec. 13, 2022

(54) DISTRIBUTED VIDEO PIPE

(71) Applicant: DISPLAYLINK (UK) LIMITED, Cambridge (GB)

(72) Inventors: Jonathan Alexander Jeacocke, Bedford (GB); Eric Kenneth Hamaker, Cambridge (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/584,954

(22) Filed: Jan. 26, 2022

(65) Prior Publication Data

US 2022/0156028 A1 May 19, 2022

Related U.S. Application Data

(63) Continuation of application No. 16/095,286, filed as application No. PCT/GB2017/051072 on Apr. 18, 2017, now Pat. No. 11,269,577.

(30) Foreign Application Priority Data

Apr. 22, 2016 (GB) ..................................... 1607073

(51) Int. Cl.
*G06F 3/14* (2006.01)
*G06F 3/048* (2013.01)
*G06F 3/0484* (2022.01)

(52) U.S. Cl.
CPC ............ *G06F 3/1446* (2013.01); *G06F 3/048* (2013.01); *G06F 3/0484* (2013.01); *G09G 2300/026* (2013.01)

(58) Field of Classification Search
CPC ...... G06F 3/048; G06F 3/0481; G06F 3/0484; G06F 3/1446
See application file for complete search history.

(56) References Cited

U.S. PATENT DOCUMENTS 6,411,302 B1 6/2002 Chiraz
2005/0134525 A1 6/2005 Tanghe et al.
(Continued)

FOREIGN PATENT DOCUMENTS

WO 2007/020406 A1 2/2007

*Primary Examiner* — Michael A Faragalla
*Assistant Examiner* — Sujit Shah
(74) *Attorney, Agent, or Firm* — Paradice & Li LLP

(57) ABSTRACT

A display device has a plurality of display panels (21) together forming a single display screen, where each display panel (21) is connected to a display controller (24) which receives display data of a portion of a complete image for display on the display panel (21). The complete image (S1) includes one or more bounded regions (S2, S3, S4, S5) of display data. Each display controller (21) also receives position information relating to a change in lateral position and/or stacking order position of one or more bounded regions that are to be displayed at least partly on that display panel (21). If the display controller (24) determines that it does not have knowledge of display data in the bounded region (S2, S3, S4, S5) to be displayed on the display panel for which the position information was received, it obtains that knowledge from another display controller (24) that has such knowledge. The display controller (24) then processes the display data for the portion of the complete image utilising the knowledge obtained from another display controller (24), and outputs the processed display data for the portion of the complete image to the corresponding display panel (21).

20 Claims, 10 Drawing Sheets

(56) References Cited

U.S. PATENT DOCUMENTS

| | | |
|---|---|---|
| 2009/0096711 A1 | 4/2009 | Jang et al. |
| 2010/0123732 A1 | 5/2010 | Jenks et al. |
| 2010/0156854 A1 | 6/2010 | Fisher et al. |
| 2010/0321410 A1 | 12/2010 | Jenks et al. |
| 2015/0340009 A1 | 11/2015 | Loeffler et al. |
| 2016/0086584 A1 | 3/2016 | Yokosuka |
| 2016/0266859 A1* | 9/2016 | Akatsuka .............. G06F 3/1446 |
| 2016/0357493 A1 | 12/2016 | Zerwas |

* cited by examiner

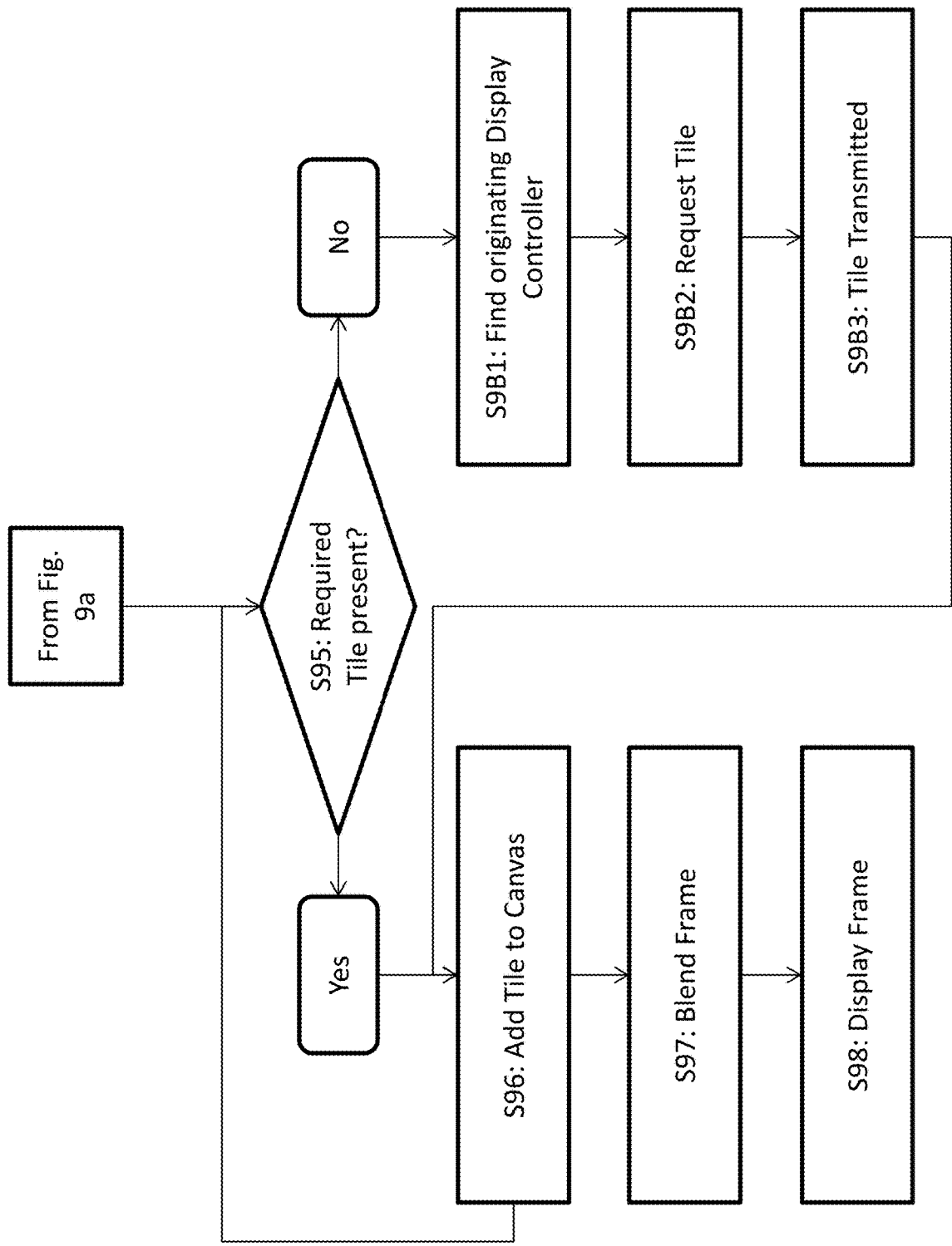

DISTRIBUTED VIDEO PIPE

CROSS-REFERENCE TO RELATED APPLICATIONS

This application is a continuation of U.S. patent application Ser. No. 16/095,286 filed Oct. 19, 2018, entitled "DISTRIBUTED VIDEO PIPE," which is a U.S. national stage application under 35 U.S.C. § 371 of International Patent Application No. PCT/GB2017/051072, filed on Apr. 18, 2017, which claims the benefit of Great Britain Patent Application No. 1607073.2 filed on Apr. 22, 2016, the contents of each of which are incorporated herein by reference in their entirety.

The present invention relates to a system in a multi-panel display environment, and to a display controller for use in such a system and a method used by the display controller and the system.

BACKGROUND

In a system comprising a computing device which generates display data, known as a host device, and a connected display device or devices, the bandwidth of the connection between the host device and the display device or devices will usually be limited. This in turn means that the resolution of the display, or collective resolution of the multiple displays, will also be limited. This is undesirable in the current market; host devices are becoming more powerful and capable of generating larger and more detailed images while modern displays are capable of increasingly large image resolution, and users wish to take advantage of this capability. It is therefore desirable for display devices to scale along with the capacity of computing devices.

It is possible to simulate a large and/or high-resolution display device by using many separate display panels, each with an associated decoder. An image is produced and encoded on the host device, and then separate parts are sent to the decoders, which are synchronised to produce a single overall image on the connected panels. However, this does not solve the problem of limited bandwidth as the connection between the encoder and decoders may often still provide a bottleneck.

It is an object of the present invention to solve, or at least mitigate, this problem.

SUMMARY

According to a first aspect of the invention there is provided a method of displaying an image on a display device having a plurality of display panels, the display panels together forming a single display screen for displaying at least one complete image, each display panel having a display input connected to a display controller of a plurality of display controllers for receiving display data of a portion of the complete image, wherein each display controller of the plurality of display controllers provides display data for one or more display panels, wherein the complete image is formed of a plurality of tiles of display data and each display panel displays the display data of the tiles forming the portion of the complete image for display on that display panel, the complete image including one or more bounded regions of display data, wherein each bounded region is displayed and may be moved as a whole to at least partly change position laterally from one display panel to another within the complete image or to have a new position within a stacking order of a plurality of bounded regions, wherein the stacking order provides an order whereby only one or more topmost bounded region(s) in the stacking order would be displayed in the complete image, the method comprising, at a display controller:

receiving at least the display data destined for a display panel connected to the display controller;

receiving position information relating to a change in lateral position and/or stacking order position of one or more bounded regions that are to be displayed at least partly on a display panel connected to the display controller;

determining whether the display controller already has knowledge of the tiles of display data in the bounded region to be displayed on the display panel for which the position information was received;

if the display controller determines that it does not have knowledge of one or more of the tiles in the bounded region, obtaining knowledge of the one or more tiles from another display controller that has such knowledge;

processing the display data for the portion of the complete image utilising the knowledge of the one or more tiles obtained from another display controller; and outputting the processed display data for the portion of the complete image to the corresponding display panel.

In one embodiment, the knowledge of a tile comprises either the display data for that tile, or an address in memory where the display data for that tile may be accessed.

The position information may, in some embodiments, be received by all the display controllers of the plurality of display controllers and the method may further comprise the display controller determining from the position information whether a new lateral position and/or stacking order position of the one or more bounded regions corresponds to a location that is to be displayed at least partly on a display panel connected to the display controller.

In an embodiment, each of the display panels has an associated global location and determining from the position information whether a new lateral position and/or stacking order position of the one or more bounded regions corresponds to a location that is to be displayed at least partly on a display panel connected to the display controller comprises comparing the new lateral position and/or stacking order position with the global location associated with each of the display panels connected to the display controller.

In an embodiment, obtaining knowledge of the one or more tiles from another display controller may comprise determining which of the plurality of display controllers has such knowledge, and communicating, by the display controller, with the determined display controller(s). Determining which of the plurality of display controllers has the knowledge may comprise determining a previous location of the bounded region having the one or more tiles and determining which of the plurality of display controllers is connected to a display panel that displayed that bounded region.

In one embodiment, obtaining knowledge of the one or more tiles from another display controller comprises sending a request to all the other display controllers of the plurality of display controllers for the knowledge, and receiving the knowledge from whichever of the other display controllers has the knowledge.

In some embodiments, the display data may be received from a host device and obtaining knowledge of the one or more tiles from the other display controller that has such knowledge may comprise communicating, by the display controller, with the other display controller without requiring communication with the host device, unless display data within the one or more tiles as changed.

Each bounded region of display data may comprise a plurality of tiles, a location and a position in the stacking order, and each tile of display data may have its own unique identification.

Furthermore, each tile of display data may comprise coded or compressed data, at least when received by the display controller.

In a second aspect, the invention provides a display control device for displaying a portion of a complete image on one display panel of a plurality of display panels forming a display device displaying the complete image, the device configured to perform the method described above.

According to a third aspect, the invention provides a system comprising a host device for generating display data of a complete image, a plurality of a display control devices, each display control device comprising a display control device as mentioned above and a display device comprising a plurality of display panels, each display panel connected to a display control device for displaying a portion of the complete image.

In an example, there is provided a system comprising a host device connected to two or more display controllers which share memory and co-ordinate the movement of bounded regions, which may be bounding rectangles, between themselves with minimal host device intervention or additional rendering. Each display controller is connected to one or more panels which form a single display surface together with the panels connected to other display controllers. The panels connected to each display controller comprise that display controller's allocated area.

A bounded region is a collection of display data displayed as a single image and commonly having a single source. A common example is an application window, but other examples may include desktop backgrounds or areas within application windows such as video panes. For the purposes of the present discussion, a bounded region is represented as a set of one or more tiles, a location, and a position in a stacking order. The location may, for example, be represented as a co-ordinate position of the upper left corner. Alternatively, all the corners or a centre point may be used, or locations of the edges, depending on the exact embodiment. The stacking order indicates the order in which bounded regions will 'overlap' if they occupy the same space on a panel. This is an example embodiment only; a bounded region could also be embodied as, for example, a location and instructions for generating the required display data. Furthermore, although the 'bounded regions' as described herein are rectangles, as mentioned above, such bounded regions may be rectangles, or other shapes may be used as appropriate, for example triangles and trapezoids, and the 'bounding rectangle' data will be different as appropriate for the shape. Furthermore, the bounded regions need not be particular shapes, but may be any region that is determined to move in an integral fashion. For example, in some cases, a region may be determined to be bounded by edges of an artefact, and such edges may be determined by changes in colour, texture or any other parameter, so that the bounded region may be of any shape, whether regular or irregular.

In an example, the host device first transmits display data comprising each bounded region to the display controllers. This comprises:
1. The host device generating bounded regions: tiles, location, and stacking order
2. The host device being aware of the location relative to the entire display surface of each allocated area and transmitting the required tiles to the display controllers controlling each allocated area
3. The display controllers compositing the data to create a displayed image for each connected panel
4. The display controllers displaying the data on the panels such that there appears to be a single image displayed on a single display surface When a bounding rectangle is moved, the display controllers co-ordinate between each other in order to minimise data required from the host. This may comprise:
1. The host device transmits the new location of the bounded region (s) to all the display controllers;
2. Each display controller is aware of the locations covered by its allocated area and determines if the bounded region will intersect or cease to intersect with those locations. If not, the display controller continues to display its current output and takes no further action;
3. If the movement of the bounded region will affect the image on the display controller's allocated area, the display controller begins re-displaying its bounded regions;
4. When the display controller requires a tile it does not have access to, it transmits a signal to the display controller that was previously displaying that bounded region, requesting the tile;
5. The previous display controller transmits the required tile; this repeats until all required tiles have been requested and transmitted;
6. The current display controller compositing the display data and displaying it as previously described.

When display data is updated, the host device updates the single memory location where each changed tile is stored and the appropriate display controller can re-compose and display the appropriate bounded region immediately. It is not necessary for the host device to transmit a full frame or to duplicate data being transmitted.

Alternatively, instead of a display controller requesting required tiles from another display controller, a display controller may check the new location of a tile moving out of its allocated area and proactively transmit the data to the display controller that now requires that tile.

The memory shared by the display controllers may be a single central memory shared by all the display controllers and containing a single copy of all the tiles. In this case, no display data is transmitted between the display controllers and the step of transmitting a tile is fulfilled by transmitting the memory address at which the display data comprising that tile can be found. This is advantageous as it means that data does not need to be transmitted between display controllers and therefore movement of a bounded region between panels may be faster; it is therefore preferable where there is considerable movement between allocated areas. Furthermore, the host device can access and update the same memory when there is a change to tile data rather than needing to be aware of which display controller is responsible for a tile at any given time and this embodiment may therefore be preferable when there is a significant amount of change in display data from frame to frame. However, it requires the display controllers to fetch data from the central memory constantly as it is not stored locally.

Alternatively, the memory may be distributed such that each display controller has its own local memory where the tiles it requires are stored. Consequently, each display controller has the data it needs locally and does not need to fetch it from a remote source. It is also more easily scalable as each display controller can have a small, relatively cheap memory rather than a large memory being required, which must be increased in size if more display controllers are added.

It is especially beneficial for desktop use cases, compared to the embodiment where there is a central memory, as in such cases it is likely that there will be little movement between allocated areas, but possibly significant changes within an allocated area, such as changing display data and minimising or maximising of application windows. In this case, when a tile is transmitted the actual tile data is transmitted from one display controller to another and, when the transmission is complete, the source data controller may erase the tile's display data from its memory.

In some embodiments, there may be multiple host devices connected to the display controllers. In such a system, the host devices communicate with one another in order to maintain a common list of bounded regions with their stacking order, such that conflicts can be resolved. The methods of updating the displayed data and co-ordination between the display controllers will not change.

Therefore, in at least some embodiments, the workload associated with pixel display is distributed among a series of engines (such as, display controllers), allowing them to move content and work amongst themselves. It is therefore unnecessary for the host device to re-send a significant volume of data when the displayed image changes, so more data can effectively be sent down the same limited bandwidth. Because data is passed between the engines, a high aggregate bandwidth may be provided.

BRIEF DESCRIPTION OF THE DRAWINGS

Embodiments of the invention will now be more fully described, by way of example only, with reference to the drawings, of which:

FIGS. 9A and 9B show the process of co-ordination between display controllers when a bounded region moves.

DETAILED DESCRIPTION OF THE DRAWINGS

Figure 1:
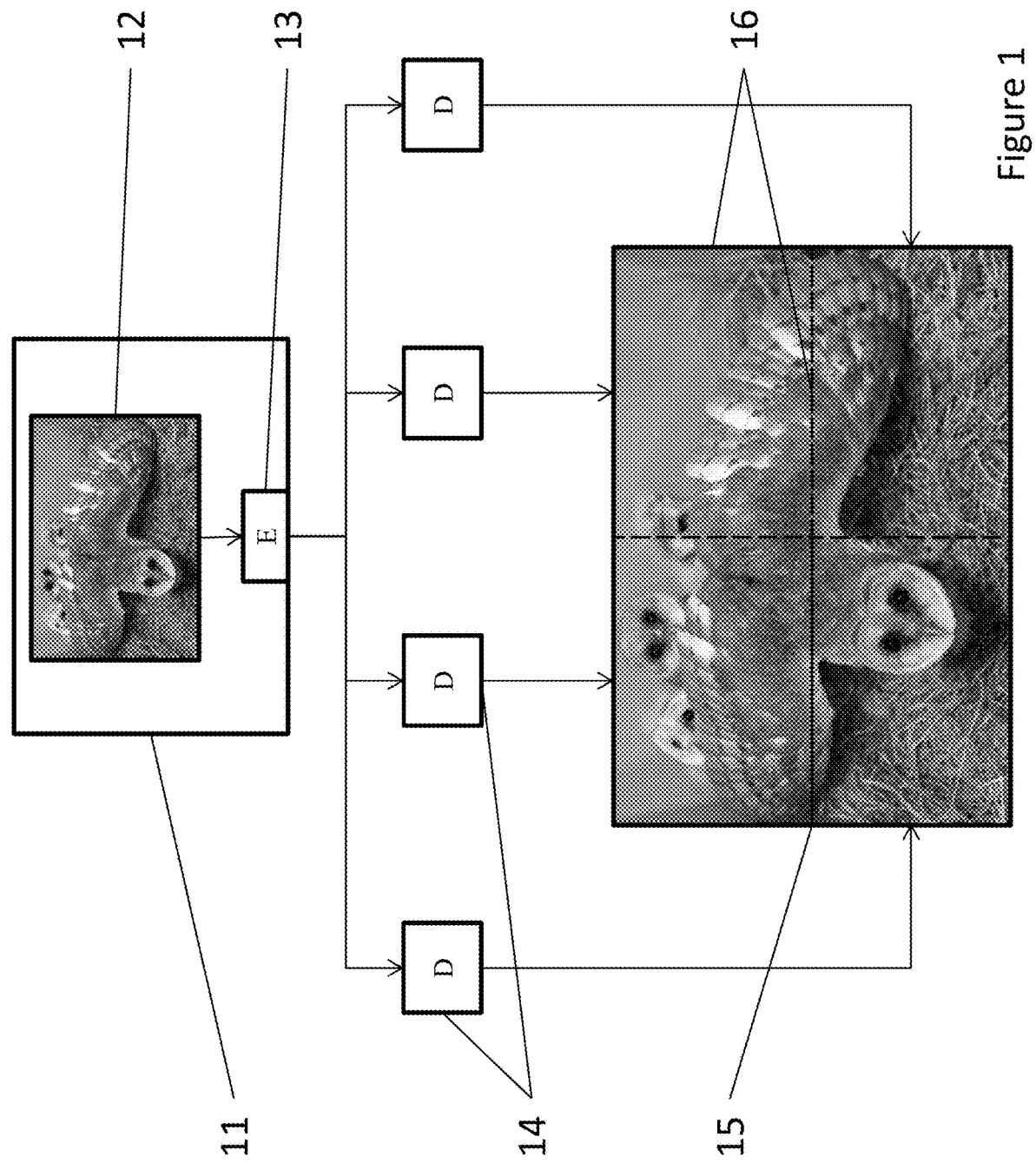
FIG. 1 shows the desired result, together with problems caused by the current art.

FIG. 1 shows a frame [12] which has been generated by a host (device) [11]. It is encoded by a single encoder [13], and transmitted to four decoders [14], each of which is connected to a panel [16]. The panels form a single display surface [15]. The intention is to parallelise the decoding process in order to improve the speed at which a large image can be displayed on the display surface [15]. In some implementations, each decoder [14] only receives the relevant part of the image to be displayed [12], in others the whole image [12] is sent to each decoder [14], but the decoders only decode and display the relevant parts of the image [12].

However, in both cases if there is a change to the display data, especially one that requires a decoder [14] to display new data, a significant amount of data must be encoded and transmitted. This results in excessive processing by the encoder [13] and an excessive amount of data being transmitted through the connection to the decoders [14], even though the same data may be required and merely be in a different configuration.

Figure 2:
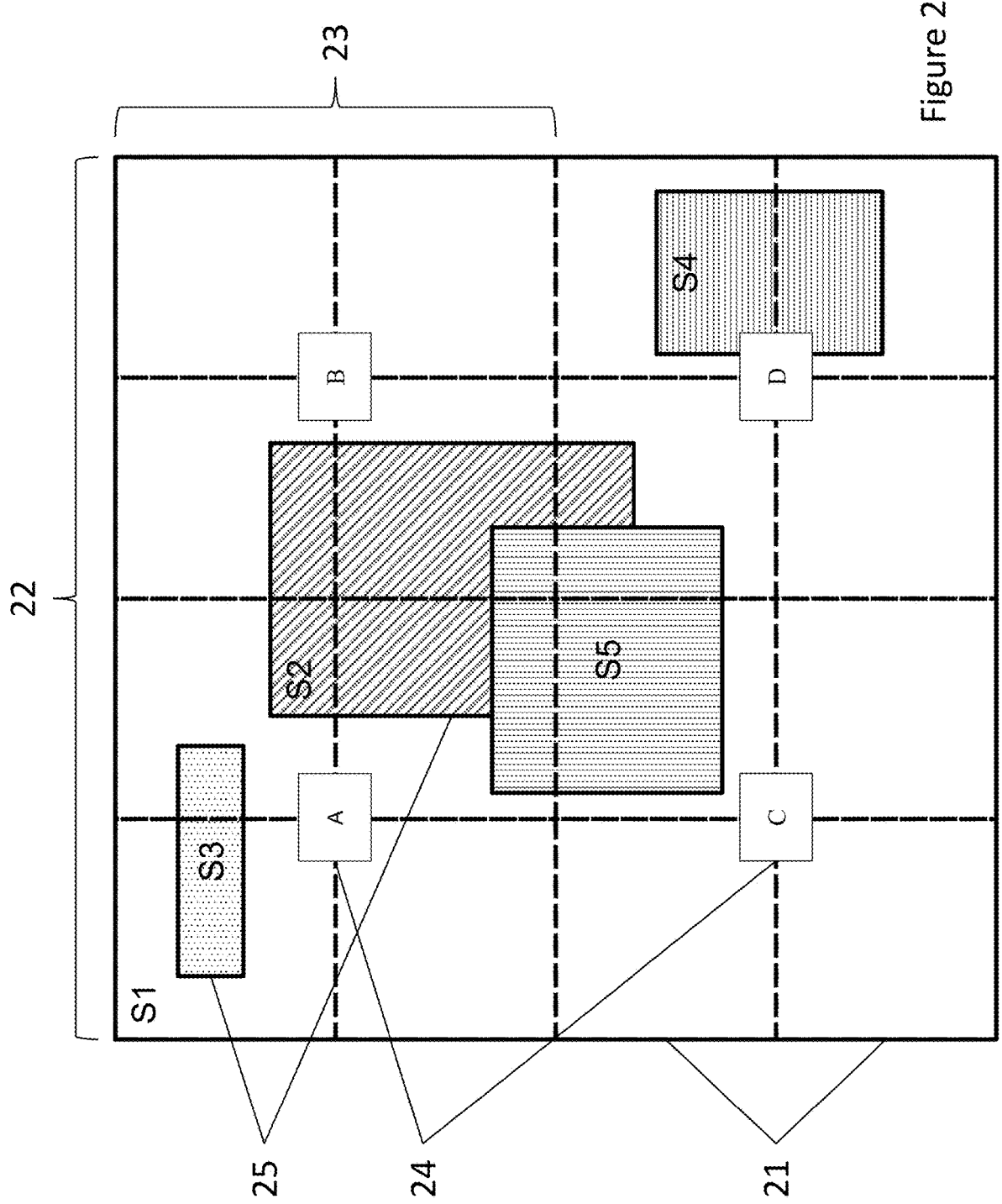
FIG. 2 shows a number of bounded regions on panels connected to a number of display controllers arranged according to an embodiment of the invention.

FIG. 2 shows a display surface [22] having sixteen panels [21]. These are represented by squares outlined with dotted lines. Each group of four panels is an area [23] allocated to a display controller [24] A, B, C, or D and these are not specifically shown, but represented by labels, the label overlapping with the panels [21] that comprise the allocated area [23] of the relevant display controller [24].

The display surface [22] is illustrated as displaying five bounded regions, in this example, five bounding rectangles [25], which are indicated by patterned rectangles labelled S1, S2, S3, S4, S5. One such rectangle (S1) comprises an image such as a desktop background which covers the whole of the display surface [22]. The others may, for example, be application windows or operating system widgets. The bounding rectangles [25] are indicated with different shading in order to distinguish them:
  S1 is plain;
  S2 is marked with diagonal hatching;
  S3 is marked with dots;
  S4 is marked with horizontal hatching; and
  S5 is marked with vertical hatching.

As can be seen in FIG. 2, bounding rectangles [25] may overlap one another; Bounding Rectangle S5 [25S5] is displayed 'on top of' Bounding Rectangle S2 [25S2] and Bounding Rectangle S1 [25S1] is displayed 'underneath' all the other bounding rectangles [25]. This is determined by the stacking order of the bounding rectangles [25] and the display data of the bounding rectangles [25] is combined to create the impression of stacking during composition.

The reference number [24] will hereinafter refer generically to both embodiments of the display controller shown in FIGS. 3 and 4, although they have different components and properties as hereinafter described and will be referred to by different reference numbers within their respective Figures.

Figure 3:
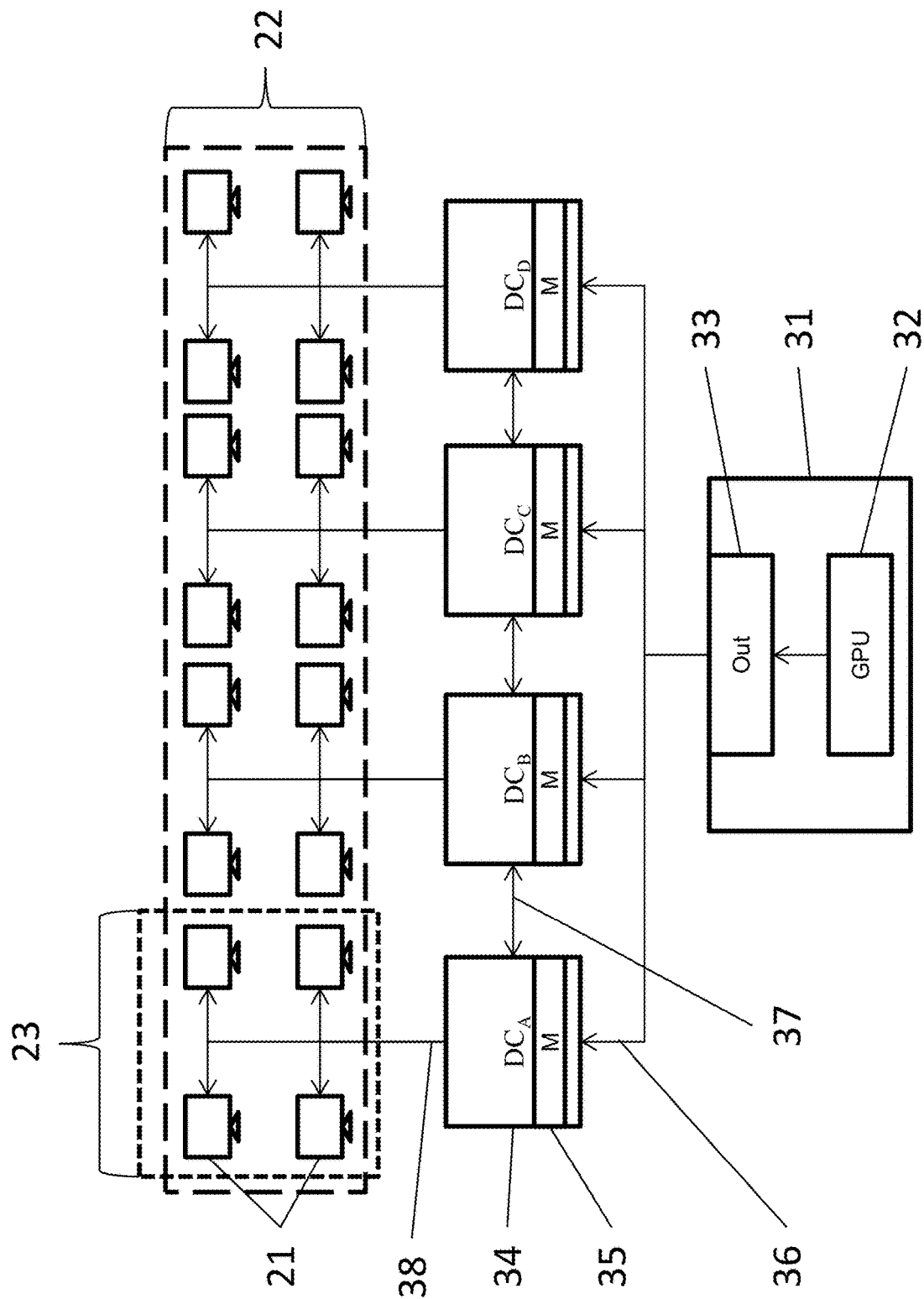
FIG. 3 shows a system arranged according to an embodiment of the invention with a distributed memory.

FIG. 3 shows an entire system according to one embodiment of the invention, which, compared to the current art as shown in FIG. 1, has added communication between the decoding blocks, or display controllers, in order to minimise data processed and transmitted by the host.

This system comprises a host [31] connected to four display controllers [34], each of which is connected to four panels [21]. The panels connected to each display controller [34] comprise its allocated area [23], as previously mentioned, and are connected and synchronised so that they can display a single, seamless image, as is the case for the system shown in FIG. 1. The four allocated areas [23] are also synchronised so that together they comprise a single display surface [22].

The host [31] includes a Graphics Processing Unit (GPU) [32], which generates display data for display on the display surface [22]. The display data is then passed to an output engine [33], which will perform processing such as encoding and compression, and may also convert the data into a format suitable for the transmission mechanism [36] between the host [31] and the display controllers [34], if required. The host [31] may also send commands to the display controllers, such as scaling and rotation information.

The display controllers [34] decode and decompress the display data and may also carry out other processing such as additional video decoding or the aforementioned rotation or scaling, as appropriate. They also carry out composition of frames, which in conventional systems is carried out on the host [31]. Each display controller [34] has a memory [35] where display data is stored for easy access, meaning that unless the display data needs to be updated, no further communication with the host [31] is required; the display controller [34] is able to refresh the images shown on its allocated area [23]—i.e. the four panels connected to it—from its memory [35]. Because the composition is carried out locally, this also means that if part of a bounding rectangle becomes visible no further data need be sent by the host [31]. Even without the benefits of the communication [37] between display controllers [34], there is therefore an increase in efficiency.

The display controllers [34] are connected [37] to one another in order to allow them to communicate and exchange signals and display data. Because they do this, even if a display controller [34] requires display data that it does not have in its memory [35], the host [31] does not need to transmit further data unless there is a change in the data itself, as opposed to how it is displayed.

If appropriate, the host [31] may be connected to the display controllers [34] via a switch and a number of bidirectional connections. The presence of the switch means that the same connections can be used for communication [37] between display controllers [34] as is used for communication [36] between a display controller [34] and the host [31]: a display controller [34] sends a signal addressed to a second display controller [34] and the switch directs it to the second display controller [34] rather than the host [31]. However, this embodiment is functionally the same as that shown in FIG. 3 and therefore will not be further discussed.

Figure 4:
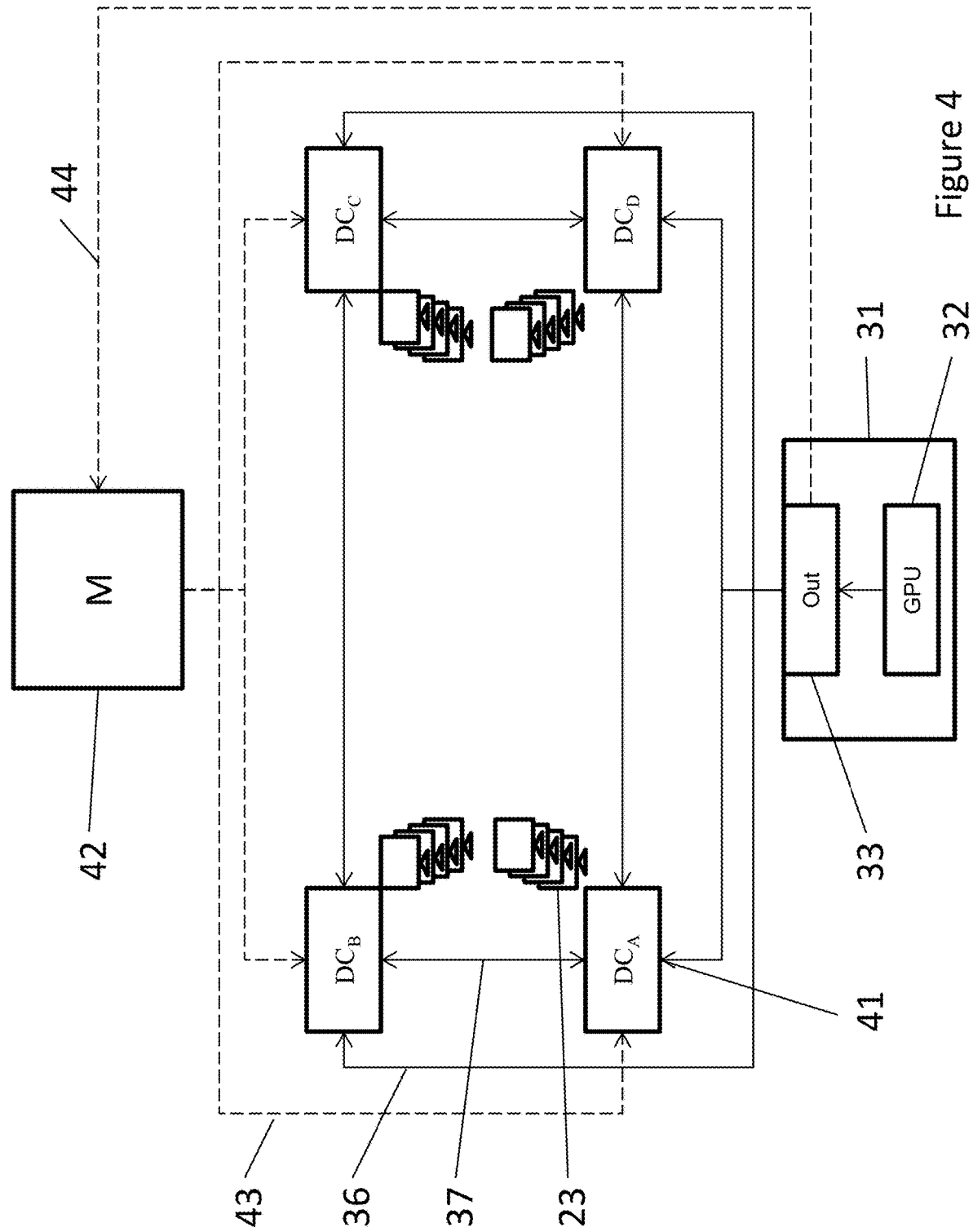
FIG. 4 shows a system arranged according to an embodiment of the invention with a central memory.

FIG. 4 shows an alternative embodiment in which, instead of each display controller [41] having a local memory, there is a single memory [42] which is shared by all the display controllers [41]. This may have benefits over the system shown in FIG. 3 where the connections [43] between the display controllers [41] and the memory [42] are fast and reliable, for example using optical connections. It also means that the host [31] does not need to be aware of which display controller [41] requires a specific tile during the initial transmission of display data or after a change in the data; it is able to send all display data directly to the memory [42]. Furthermore, if there are duplicate tiles required—for example, a tile consisting of plain white may be required in many places in a desktop environment—each unique tile could be stored a single time in the central memory [42] and accessed multiple times by many display controllers [41], leading to a more efficient use of memory.

In FIG. 4, data connections [43, 44]—i.e. connections over which display data is transported—are shown by dotted lines and signal connections [36, 37] are shown by solid lines. The host [31] is connected directly to the memory [42] via a data connection [44], and the memory [42] is in turn connected to each display controller [41] by a data connection [43]. The host [31] is connected to the display controllers [41] by signal connections [36] which allow it to update the bounding rectangles stored on the display controllers [41] and send other commands, and the display controllers [41] are connected to one another by signal connections [37] in order to enable them to send signals to one another to request data, which may be sent, for example, as memory addresses referencing the position of required tiles in the main memory [42].

In an alternative embodiment, instead of the host [31] being connected directly to the memory [42] by a data connection [44], it could be connected to one or more of the display controllers [41] by data connections; it would then transmit display data to the display controller or controllers [41], which would route it on to the memory [42] using its or their own data connections [43]. This would mean that the host [31] need not be aware of whether it is communicating with display controllers [34] that have their own memories, such as those shown in FIG. 3, or display controllers [41] connected to a single memory [42], as shown in FIG. 4.

As previously mentioned with regard to FIG. 3, the host [31] may, if appropriate, be connected to the display controllers [41] via a switch and a number of bidirectional connections. The presence of the switch means that the same connections can be used for communication [37] between display controllers [41] as is used for communication [36] between a display controller [41] and the host [31]: a display controller [41] sends a signal addressed to a second display controller [41] and the switch directs it to the second display controller [41] rather than the host [31]. The switch may be co-located with the main memory [42], meaning that instead of a number of separate connections [36, 37, 43, 44], all communication could be directed through the main memory [42]. However, this embodiment is functionally the same as that shown in FIG. 4 and therefore will not be further discussed.

Finally, as in FIG. 3, each display controller [41] has an associated allocated area [23], comprising multiple panels as previously described.

Figure 5:
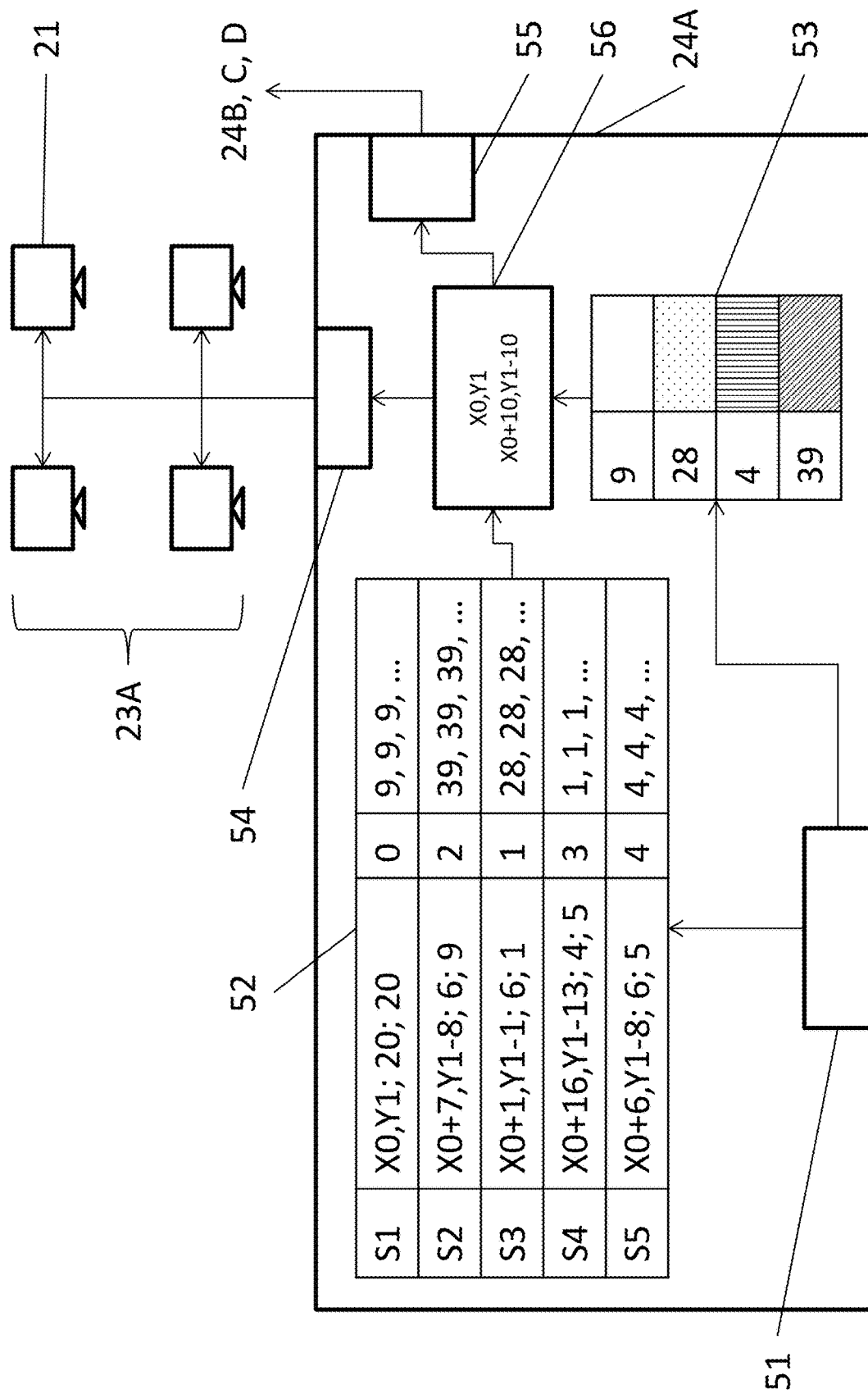
FIG. 5 shows a display controller with some internal components and example bounded region data.

FIG. 5 shows a detail of Display Controller A [24A], as shown in FIG. 3. The other display controllers [24B, C, D] could be similarly arranged, but will store different tile data as appropriate. As shown in FIG. 3, the display controller [24A] is connected to an allocated area [23A] comprising four panels [21], as well as to the host [31] and the other display controllers [24B, C, D]. Within the display controller [24A], there are various components including an input engine [51], a processor [56], an output engine [55], and two memories [52, 53]. The two memories [52, 53] may, of course, be areas of a single memory, but they are shown separately for clarity.

The input engine [51] is arranged to receive data from the host [31] and other connected display controllers [24B, C, D] and as such is connected to the host [31] and adjacent display controllers [24B, C, D]. The connections may be wired—including optical—or wireless, and may be over a network, including the internet, and they need not all be over the same medium; i.e. one may be wired, one wireless, and one over a network connection, or any other combination. The input engine [51] is arranged to determine whether received data is a tile, bounding rectangle data, or some other type of signal such as a command by, for example, reading flags in a packet header. Such a packet header is also likely to include information about which bounding rectangle is being amended, whether new tile data is a replacement for an existing tile, or other data as appropriate.

The input engine [51] may also decode and decompress received display data if appropriate. Alternatively, it may only decode data, which is then stored in compressed form, or the data may be stored encoded and compressed, whichever is appropriate for the embodiment.

If the input engine [51] determines that the received data is a tile, it directs it to the Tile Store [53], which is an area of memory containing, in this embodiment, unique tiles referenced by overall global Tile Reference Number. These numbers will refer to the associated tiles across the whole system, meaning that a tile can be requested or referenced by Tile Reference Number. A new tile is stored in the Tile Store [53] along with its Tile Reference Number, or if a tile is received with a Tile Reference Number already contained in the Tile Store [53], the existing tile may be overwritten.

In a display controller [41] such as those shown in FIG. 4 which do not have local memories but are instead connected to a central memory [42], the Tile Store [53] will be external, in the central memory [42], and tile data will not be received by the input engine [51] of the display controller [41]. Otherwise, operation can be the same.

If the input engine [51] determines that the received data is bounding rectangle data, it directs it to the Bounding Rectangle Table [52]. This contains the reference data required for identifying and displaying bounding rectangles [25]. For each bounding rectangle [25], the Bounding Rectangle Table [52] stores a reference number (S1 . . . S5), position data, the bounding rectangle's [25] position in the stacking order, and the tiles required for the bounding rectangle [25], ordered from left to right and top to bottom and referenced by Tile Reference Number. In this embodiment, the locations of the bounding rectangles [25] are indicated by the X-Y co-ordinates of the top left corner, together with the width and height of the bounding rectangle [25].

Both the Tile Store [53] and the Bounding Rectangle Table [52] are connected to a processor [56]. This is capable of performing any decoding or decompression not performed by the input engine [51], as well as any further display data processing. It will also render tile data onto canvases to make up the image data contained in the bounding rectangles [25], and blend the canvases to form finished frames for each connected panel [21] in the allocated area [23A]. At this stage, the stacking order data will be used to determine data that will not be visible in the final frame due to the fact that the bounding rectangle [25] which contains it is 'behind' another bounding rectangle [25]. Commands received from the host [31] may also be used at this stage in order to control the final display of image data.

The processor [56] contains memory storing the location of the allocated area [23A], in this embodiment as the X-Y co-ordinates of the top left and bottom right corners of the allocated area [23A]. It is able to use this to determine which bounding rectangles [25] will be displayed in the allocated area [23A], and whether the entire bounding rectangle [25] will be displayed, or only part of it. This means that it can determine which tiles are required and which of the other display controllers [24B, C, D] will have the appropriate tiles stored. It can then request them.

For this purpose, it is connected to the signalling unit [55], which is connected to the other display controllers [24B, C, D]. The processor [56] uses this to request tiles from other display controllers [24B, C, D] when there is a tile miss.

Finally, the processor [56] is connected to the output engine [54], which prepares the finished frames for transmission to the connected panels [21]. This may involve, for example, multiplexing streams of display data addressed to different panels [21], as well as ensuring that the streams are co-ordinated such that they appear in a synchronised manner.

Naturally, since both the input engine [51] and the signalling unit [55] are connected to all the other display controllers [24B, C, D], the functions of both engines may be performed by a single engine.

Figure 6:
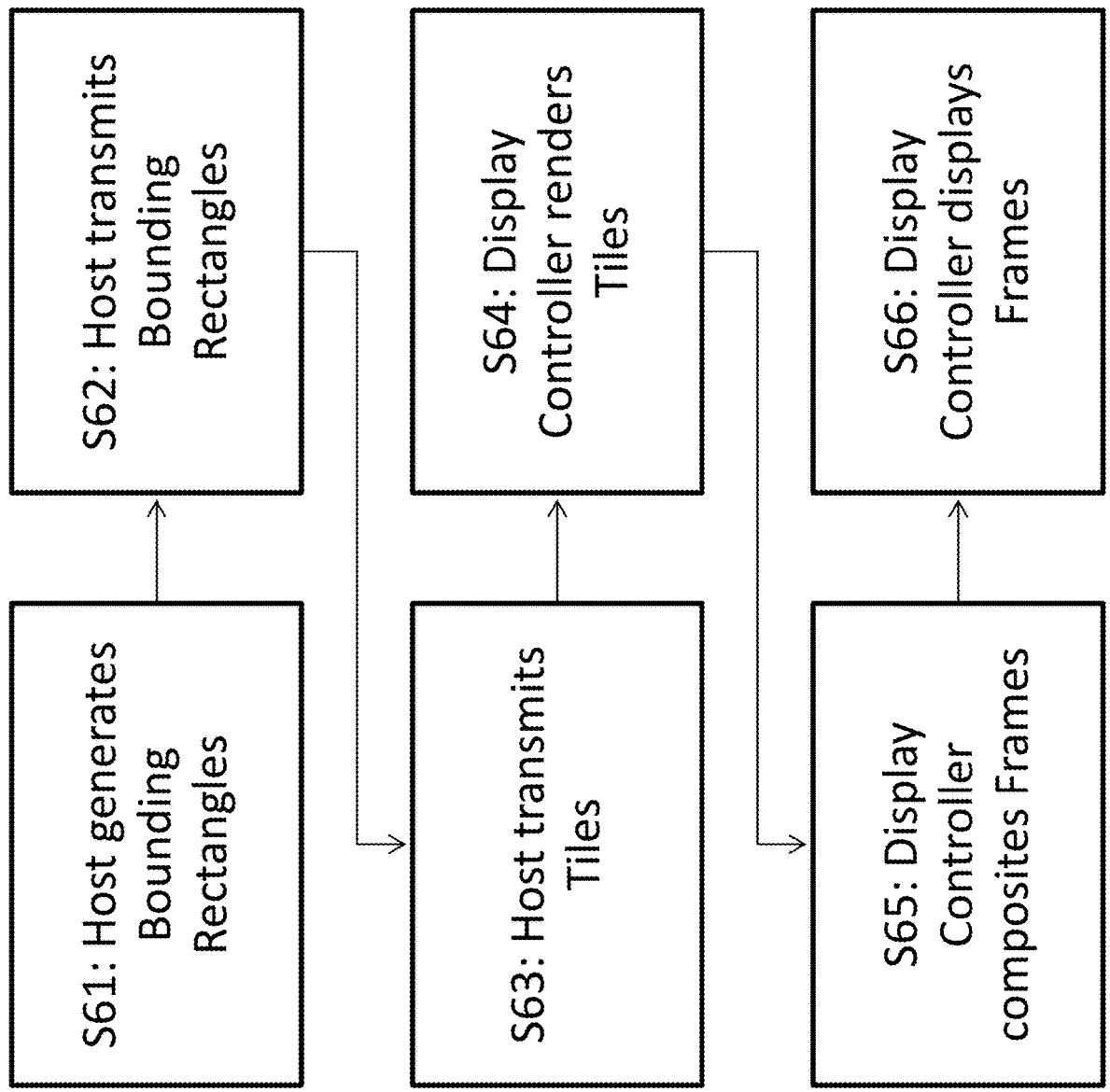
FIG. 6 shows the process of the initial image data being transmitted to the display controllers, with reference to FIGS. 2-5.

FIG. 6 shows a process of transmitting initial display data to the display controllers [24] in the systems shown in FIGS. 3 and 4. A similar process will be followed for updates, as described hereinafter.

At Step S61, the host [31] generates the data comprising the bounding rectangles [25] in the GPU [32]. As previously mentioned, the bounding rectangles [25] may be application windows or operating system areas such as a desktop background. The host [31] is aware of the location on the display surface [22] where each bounding rectangle [25] should appear and also of the stacking order, which will dictate which bounding rectangles [25] will obscure parts of other bounding rectangles [25]. It keeps a record of these details.

At Step S62, the host [31] transmits the bounding rectangles [25] to the display controllers [24]. At this step, only the details of the bounding rectangles [25] are transmitted: the locations, the bounding rectangle references, the stacking order, and the Tile Reference Numbers, which, as previously mentioned, are universal in this embodiment.

At Step S63, the host [31] then transmits the tiles to the display controllers [24]. The host [31] is aware of the locations of the allocated area [23] associated with each display controller [24] and will send only the tiles required by each display controller [24]. However, it will send all tiles that could appear in the display controller's [24] allocated area [23], regardless of whether they will currently be obscured by the tiles comprising another bounding rectangle [25]. This means that once the frame for each panel [21] is displayed, if there is a change that does not require movement between allocated areas [23], such as a window being minimised, no further data need be transmitted by the host [31] in order to allow a new frame to be composited.

At Step S64 the transmission of data is complete and each display controller [24] prepares the received tiles for compositing. In this process, a display controller [24] first creates a canvas the size of the area of each bounding rectangle [25], or the portion of the bounding rectangle [25] which is contained within the allocated area [23]. It does this by taking the location of each bounding rectangle [25] from the Bounding Rectangle Table [52] and comparing it to the location of the allocated area [23] stored in the processor [56]. This provides the width and height of the area of the bounding rectangle [25] which will appear in the allocated area [23]. Of course, the bounding rectangle [25] may not appear in the allocated area [23] at all, in which case no canvas will be created and the tiles contained in that bounding rectangle [25] will not be displayed.

The awareness of the location of each bounding rectangle [25] allows the processor [56] to calculate the tiles which will be required from the tile list that is contained in each bounding rectangle's data. If the tiles in part of the list will not be displayed, that part of the list can be skipped.

At Step S65, the display controller [24] composites the frame to be sent to the panels [21] which make up the allocated area [23]. This involves blending the pixels where the canvasses overlap, so that although there are many canvasses input there is one frame output.

At Step S66, the frame is output by the display controller [24] to the panels [21]: the processor [56] transmits the image data to the output engine [54], which converts it to an appropriate format for the connection to the panels [21] and transmits it, for example as a time-multiplexed stream. The panels [21] are then able to raster the image data received in the conventional way. When all sixteen panels [21] display their respective data, there is a single image such as that shown in FIG. 2 visible on the display surface [22].

Figure 7:
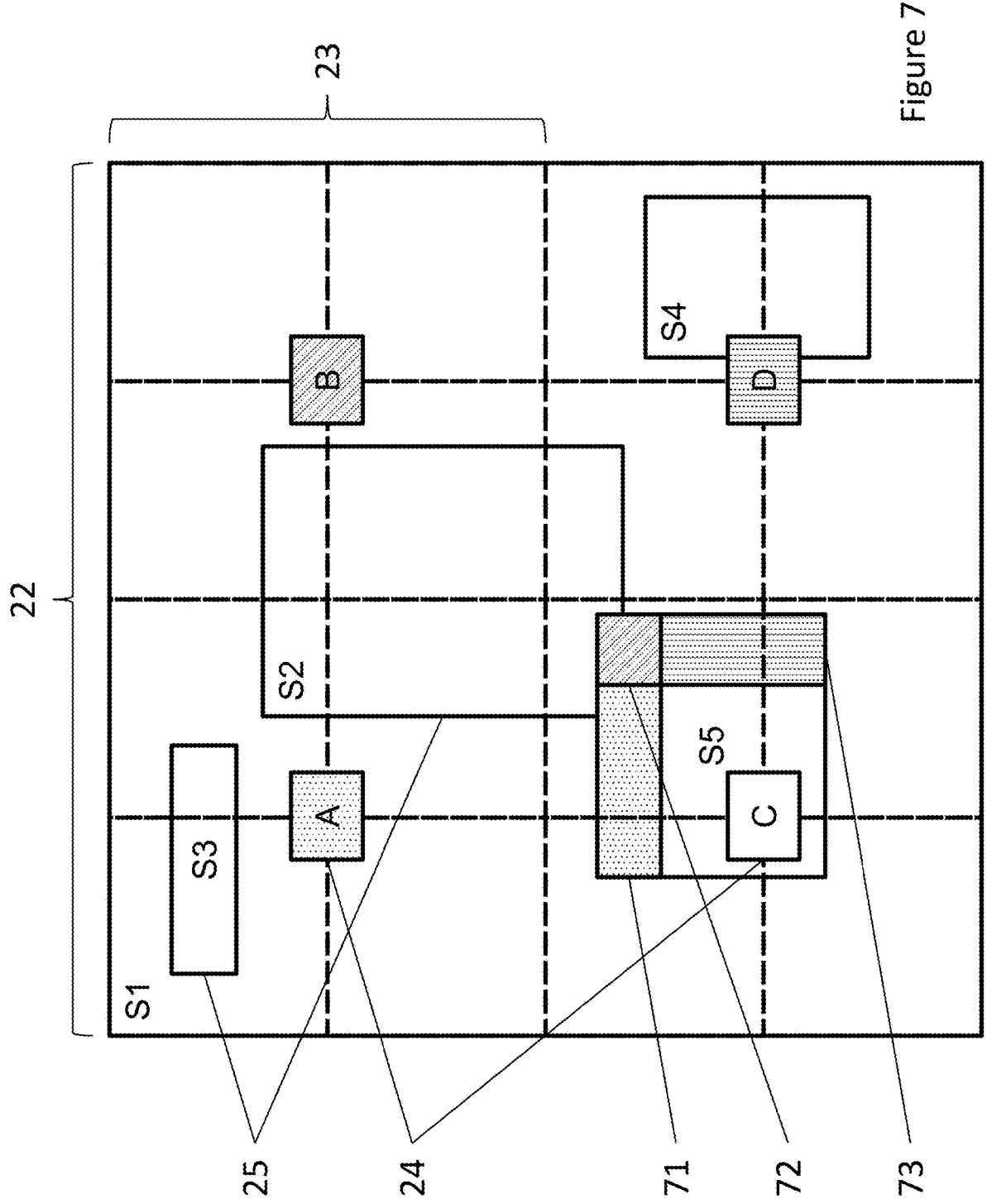
FIG. 7 shows the bounded regions shown in FIG. 4, together with the tile misses caused by one bounded region moving.

FIG. 7 shows a second version of the display surface [22] shown in FIG. 2, in which Bounding Rectangle S5 [25S5] has moved down and to the left, leaving the locations of the other bounding rectangles [25] unchanged. This means that some tiles which were not previously displayed in the allocated area [23C] of Display Controller C [24C] have now moved onto it.

The remaining three display controllers [24A, B, D] are marked with hatching: Display Controller A [24A] with dots, Display Controller B [24B] with diagonal hatching and Display Controller D [24D] with vertical hatching. This is not related to the hatching patterns used in FIG. 2 and, as such, the hatching has been removed from the bounding rectangles [25], with the exception of some areas of Bounding Rectangle S5 [25S5].

The hatched areas on Bounding Rectangle S5 [25S5] indicate the display controllers [24] responsible for the allocated areas [23] on which those areas of Bounding Rectangle S5 [25S5] were previously displayed. At the top of Bounding Rectangle S5 [25S5] is an area marked with dots [71], which contains tiles previously displayed by Display Controller A [24A]. The top right corner [72] of Bounding Rectangle S5 [25S5] is marked with diagonal hatching, indicating tiles previously displayed by Display Controller B [24B], and finally the right-hand side [73] of Bounding Rectangle S5 [25S5] is marked with vertical hatching, as it contains tiles previously displayed by Display Controller D [24D].

Figure 8:
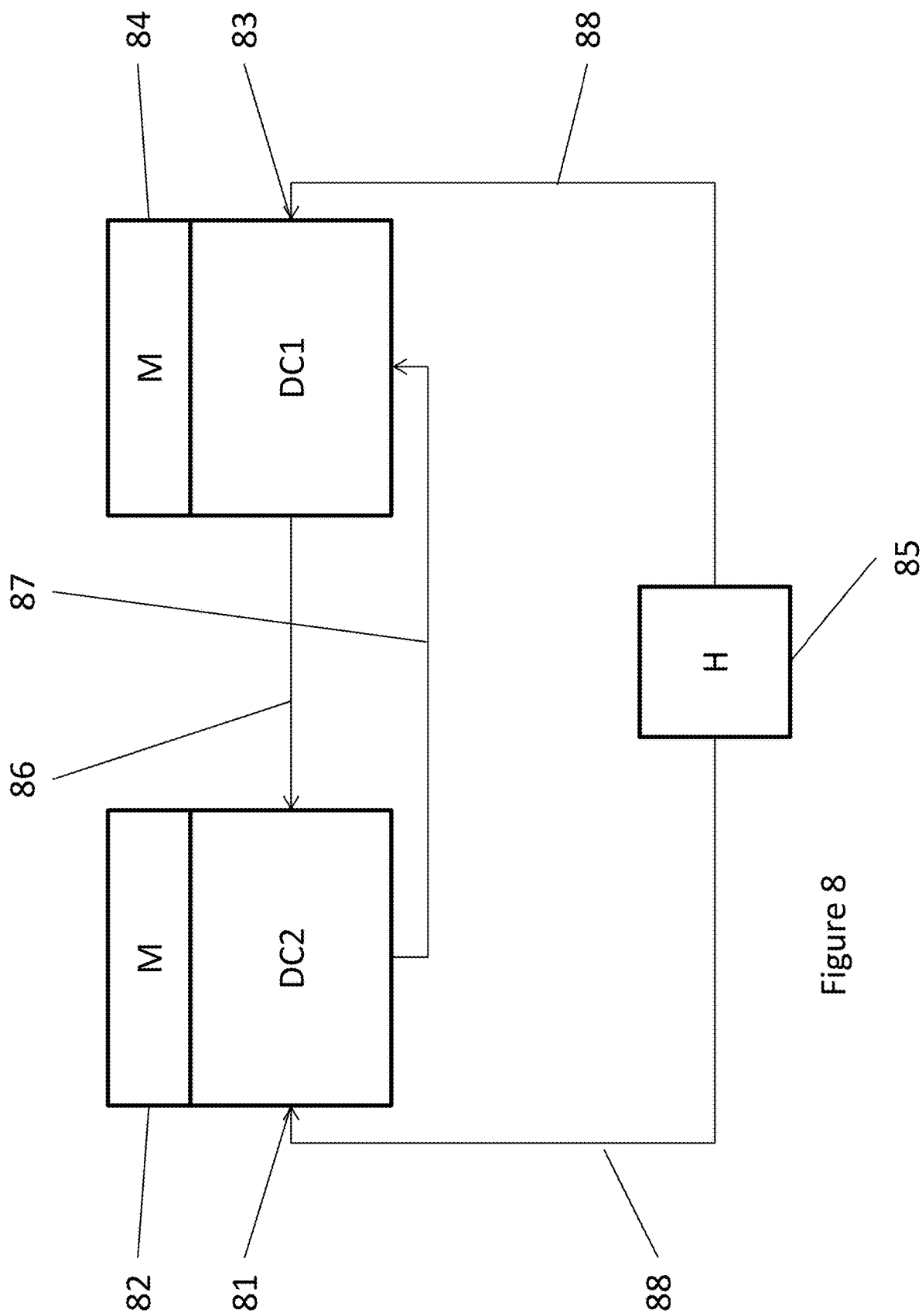
FIG. 8 shows the signals and data transfer between a host and two display controllers.

FIG. 8 shows the exchange of signals between two display controllers [81, 83] with individual local memories [82, 84] such as those shown in FIG. 3, and a host [85]. Display controllers such as those shown in FIG. 4 will not have individual memories, but are likely to have lookup tables of the addresses in the main memory [42] where tile data can be found. For the purposes of FIG. 8, such lookup tables are synonymous with the local memories [82, 84] of the display controllers [81, 83], and with the Tile Store [53] shown in FIG. 5.

Figure 9A:
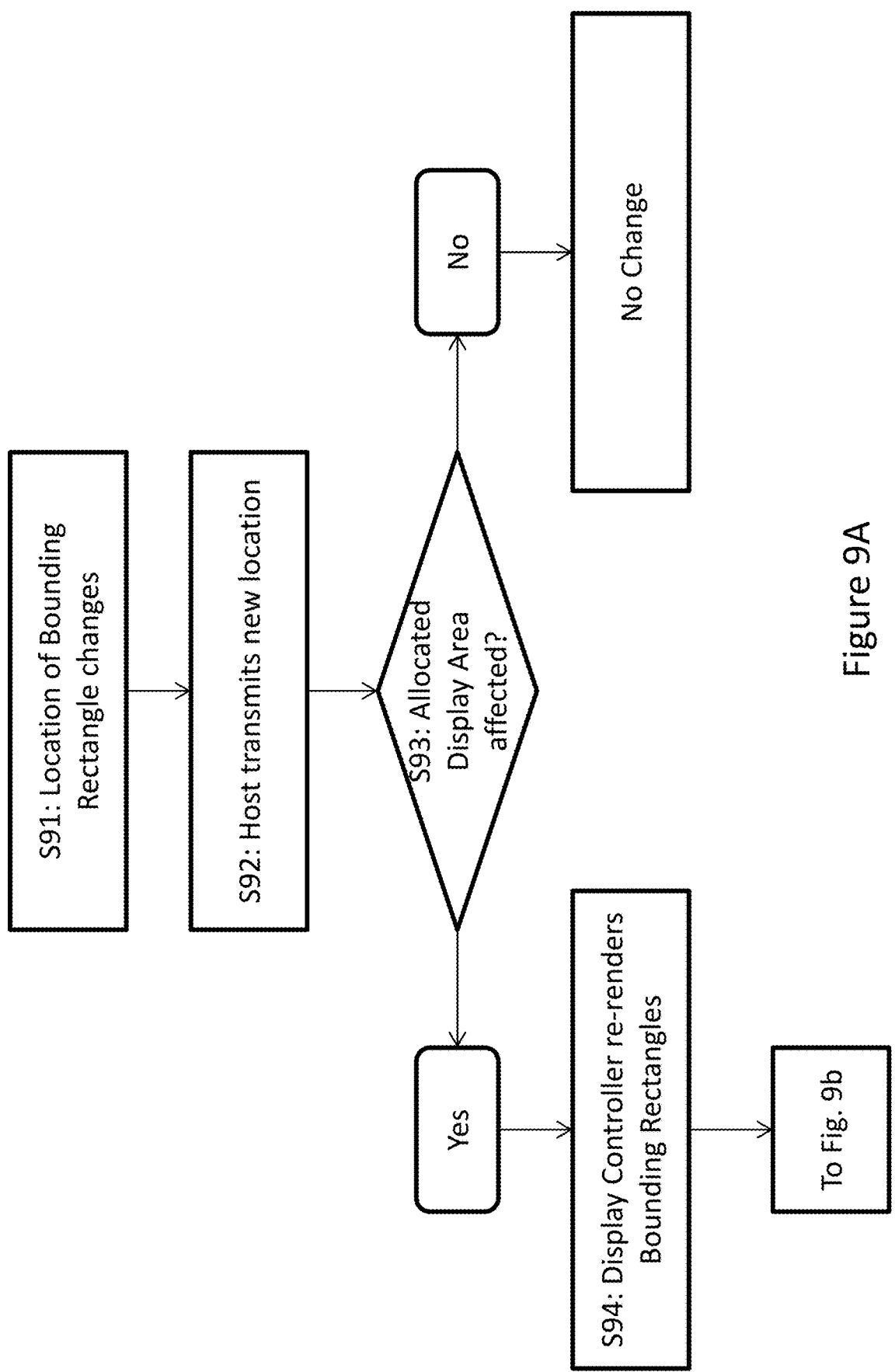

The signals themselves are explained as part of the overall process, as outlined in FIGS. 9A and 9B.

FIGS. 9A and 9B are flowcharts showing the process of communication and co-ordination between the host [31] and display controllers [24] when a bounding rectangle [25] moves as shown in FIG. 7.

At Step S91, the location of Bounding Rectangle S5 [25S5] changes. This may be, for example, due to a user interaction such as moving an application window. Alternatively, it may be as a result of an automatic process. In any case, the host's [31] record of the location of the bounding rectangle [25S5] will be updated, triggering an overall update of the bounding rectangle data. This is carried out at Step S92: the host [31] sends a signal to all the connected display controllers [24], containing the reference (S5) of the bounding rectangle [25 S5] that has changed and the new location data, as shown in FIG. 8 by signal [88].

The same will happen when the size of the bounding rectangle [25] changes, as this will also cause a change in the image shown on the display surface [22] in which parts of other bounding rectangles [25] which were previously obscured may now be visible.

This assumes that no actual change to the display data shown has taken place. If the content of the bounding rectangle [25] has changed—for example, the user has entered text into a document—the host [31] will further transmit new tiles to the appropriate display controller [24], as when it sent the initial display data as described in FIG. 6. These tiles will thereafter be available for display.

At Step S93, each display controller [24] updates its Bounding Rectangle Table [52] and checks if its allocated area [23] will be affected by the change. Because it has the new location data of the bounding rectangle [25S5], it is able to determine the location of change.

For example, if Bounding Rectangle 4 [25S4] had moved four units to the left, its new location data would be "X0+12,Y1–13;4;5", so each display controller [24] could calculate that the affected area is the area between co-ordinates X0+12,Y1–13, X0+16,Y1–13, X0+12,Y–18, and X0+16,Y1–18. In order to make this calculation more straightforward, the original location data of the Bounding Rectangle [25S4] could be transmitted along with the new location by the host [31], or the host [31] could calculate and transmit the co-ordinates of the affected area.

Each display controller [24] is aware of its own allocated area's [23] co-ordinates, as they are stored in the processor [56] as previously described. As a result, Display Controller D [24D] (Allocated area X0+10,Y1–10,X0+20,Y1–20) is aware that the affected area falls within its allocated area [23D] while Display Controller A [24A] (Allocated area X0,Y1,X0+10,Y1–10) is aware that it does not fall within its allocated area [23A]. Therefore, Display Controller D [24D] will follow the branch to the left of FIGS. 9A and 9B while Display Controller A [24A] will follow the branch to the right and take no action, continuing to display the same frame as it had previously generated.

Returning to the example where Bounding Rectangle 5 [25S5] has moved, all four display controllers [24] will be affected as, as can be seen on FIG. 2, the original location of Bounding Rectangle 5 [25S5] overlaps all four allocated areas [23].

At Step 94, each display controller [24] affected by the change will re-process all the parts of the bounding rectangles [25] it has available for display, as previously described in FIG. 6. However, unlike in the initial processing, some tiles may not be available due to the movement of the bounding rectangle [25S5], and thus the display controller [24] must check if each tile is available in the Tile Store [53].

In the example shown in FIG. 7, Bounding Rectangle 5 [25S5] has moved down and to the left compared to its original position as shown in FIG. 2. The top left tile, as is shown by the dotted shading [71], was previously displayed in Allocated Area A [23A]. When Display Controller C [24C] attempts to access this tile and checks at Step S95 to see if it is present in its local Tile Store [53], a tile miss will occur (assuming that the tile is not already present in the Tile Store [53] by coincidence) and the process will follow the right-hand branch, labelled B.

At Step 9B1, Display Controller C [24C] finds the display controller [24] from which that part of the bounding rectangle [25S5] originated. It is aware of the original location information of Bounding Rectangle 5 [25S5] as this was used to calculate the affected areas, and is also aware of the locations of the allocated areas [23A, B, D] of the other connected display controllers [24A, B, D]. It is therefore able to calculate that the required area [71] of Bounding Rectangle 5 [25S5] originally appeared in Allocated Area A [23A]. Display Controller C [24C] thereby determines that the originating display controller [24] for the top-left tile is Display Controller A [24A]. Alternatively, of course, this step could be omitted and Display Controller C [24C] could simply broadcast a request to all other display controllers [24A, B, D].

At Step S9B2, Display Controller C [24C, 81] sends a signal [87] to Display Controller A [24A, 83] requesting the tile, as shown in FIG. 8. It could, for example, use the unique tile references described with reference to FIG. 5 to reference the required tile.

At Step S9B3, Display Controller A [24A, 83] fetches the required tile from its Tile Store [53] in its local memory [84] and transmits it [86] to Display Controller C [24C, 81], as shown in FIG. 8. Display Controller C [24C, 81] then stores the tile in its own Tile Store [53] in memory [82]. The tile may be encoded before transmission or sent in a decoded state. Alternatively or additionally, it may be transmitted compressed or decompressed, regardless of whether it is stored compressed in the display controller's [24] local memory [84].

In an embodiment such as that shown in FIG. 4, in which there is a single, central memory [42], both display controllers [24A, C] will, of course, have access to the same memory [42]. However, as previously described, in this case the Tile Stores [53] of the display controllers [24A, C] will contain look-up tables of the memory addresses of the tiles in the central memory [42]. There may therefore still be a tile miss if Display Controller C [24C] does not have the memory address of the top-left tile, and it will request this at Step S9B2 and receive and store it at Step S9B3 in the same way as a full tile.

The process then moves to Step S96.

If at Step S95 the required tile is present, for example because it is in a part of the bounding rectangle [25] which was previously displayed in the same allocated area [23C], or because the image data in a bounding rectangle [25] had changed and the new data has been transmitted to the display controller [24C] by the host [31], or because it is identical to another previously-requested tile and thus already present in the Tile Store [53], the process will move immediately to Step S96 and the tile will be added to the canvas associated with the bounding rectangle [25S5]. The process then repeats from Step S95 with the next tile listed in the bounding rectangle data stored in the Bounding Rectangle Table [52].

Once the canvas is complete, it is blended with all other canvasses produced in a similar way at Step S97. This then results in a finished frame which is displayed as previously described at Step S98.

Although particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa, and engines/modules which are described as separate may be combined into single engines/modules and vice versa. Functionality of the engines or other modules may be embodied in one or more hardware processing device(s) e.g. processors and/or in one or more software modules, or in any appropriate combination of hardware devices and software modules. Furthermore, software instructions to implement the described methods may be provided on a computer readable medium.

What is claimed is:

1. A method of displaying an image by a display controller, comprising:
    receiving, from a host device, display data including location information indicating a location of a bounded region within a portion of the image configured for display on a first display panel connected to the display controller;
    receiving position information indicating a change in at least one of a lateral position or a stacking order position of the bounded region;
    identifying a first replacement tile associated with the portion of the image based on the change in the at least lateral position or stacking order position and without communicating with the host device;
    determining that the first replacement tile is stored by a display controller connected to a second display panel;
    transmitting a request for the first replacement tile to the display controller connected to the second display panel without communicating with the host device;
    receiving the first replacement tile from the display controller connected to the second display panel responsive to the request;
    processing the display data based at least in part on the first replacement tile; and
    outputting the processed display data to the first display panel.

2. The method of claim 1, wherein the first replacement tile is determined to be stored by the display controller connected to the second display panel based at least in part on an address associated with the first replacement tile.

3. The method of claim 1, wherein each of the first and second display panels has an associated global location.

4. The method of claim 3, wherein the determining that the first replacement tile is stored by the display controller connected to the second display panel comprises:
    comparing the at least lateral position or stacking order position with the global location associated with the first display panel.

5. The method of claim 1, wherein the determining that the first replacement tile is stored by the display controller connected to the second display panel comprises:
    determining a previous location of the bounded region; and
    determining that the previous location of the bounded region is associated with the second display panel.

6. The method of claim 1, further comprising:
    identifying a second replacement tile associated with the portion of the image based on the change in the at least lateral position or stacking order position; and
    requesting the second replacement tile from a display controller connected to a third display panel.

7. The method of claim 1, wherein the bounded region comprises a plurality of tiles, an associated location, and an associated stacking order position.

8. The method of claim 1, wherein the image is represented by a plurality of tiles each associated with a unique identifier, the plurality of tiles including the first replacement tile.

9. The method of claim 8, wherein each tile of the plurality of tiles includes coded or compressed data.

10. The method of claim 1, wherein the processing of the display data comprises:
    compositing the display data based at least in part on the first replacement tile.

11. A display controller comprising:
    a processor; and
    a memory storing instructions that, when executed by the processor, causes the display controller to:
        receive, from a host device, display data including location information indicating a location of a bounded region within a portion of an image configured for display on a first display panel connected to the display controller;

receive position information indicating a change in at least one of a lateral position or a stacking order position of the bounded region;

identify a first replacement tile associated with the portion of the image based on the change in the at least lateral position or stacking order position and without communicating with the host device;

determine that the first replacement tile is stored by a display controller connected to a second display panel;

transmit a request for the first replacement tile to the display controller connected to the second display panel without communicating with the host device;

receive the first replacement tile from the display controller connected to the second display panel responsive to the request;

process the display data based at least in part on the first replacement tile; and output the processed display data to the first display panel.

12. The display controller of claim 11, wherein the first replacement tile is determined to be stored by the display controller connected to the second display panel based at least in part on an address associated with the first replacement tile.

13. The display controller of claim 11, wherein each of the first and second display panels has an associated global location.

14. The display controller of claim 13, wherein the determining that the first replacement tile is stored by the display controller connected to the second display panel comprises:

comparing the at least lateral position or stacking order position with the global location associated with the first display panel.

15. The display controller of claim 11, wherein the determining that the first replacement tile is stored by the display controller connected to the second display panel comprises:

determining a previous location of the bounded region; and determining that the previous location of the bounded region is associated with the second display panel.

16. The display controller of claim 11, wherein execution of the instructions further causes the display controller to:

identify a second replacement tile associated with the portion of the image based on the change in the at least lateral position or stacking order position; and request the second replacement tile from a display controller connected to a third display panel.

17. The display controller of claim 11, wherein the bounded region comprises a plurality of tiles, an associated location, and an associated stacking order position.

18. The display controller of claim 11, wherein the image is represented by a plurality of tiles each associated with a unique identifier, the plurality of tiles including the first replacement tile.

19. The display controller of claim 11, wherein the processing of the display data comprises:

compositing the display data based at least in part on the first replacement tile.

20. A system comprising:

a host device;

a first display controller connected to a first display panel configured to display a first portion of an image; and a second display controller connected to a second display panel configured to display a second portion of the image, the second display controller being further configured to:

receive, from the host device, display data including location information indicating a location of a bounded region within the second portion of the image;

receive position information indicating a change in at least one of a lateral position or a stacking order position of the bounded region;

identify a replacement tile associated with the first portion of the image based on the change in the at least lateral position or stacking order position and without communicating with the host device;

determine that the replacement tile is stored by the first display controller;

transmit a request for the replacement tile to the first display controller without communicating with the host device;

receive the replacement tile from the first display controller responsive to the request;

process the display data based at least in part on the replacement tile; and output the processed display data to the second display panel.

* * * * *